Figure 1:
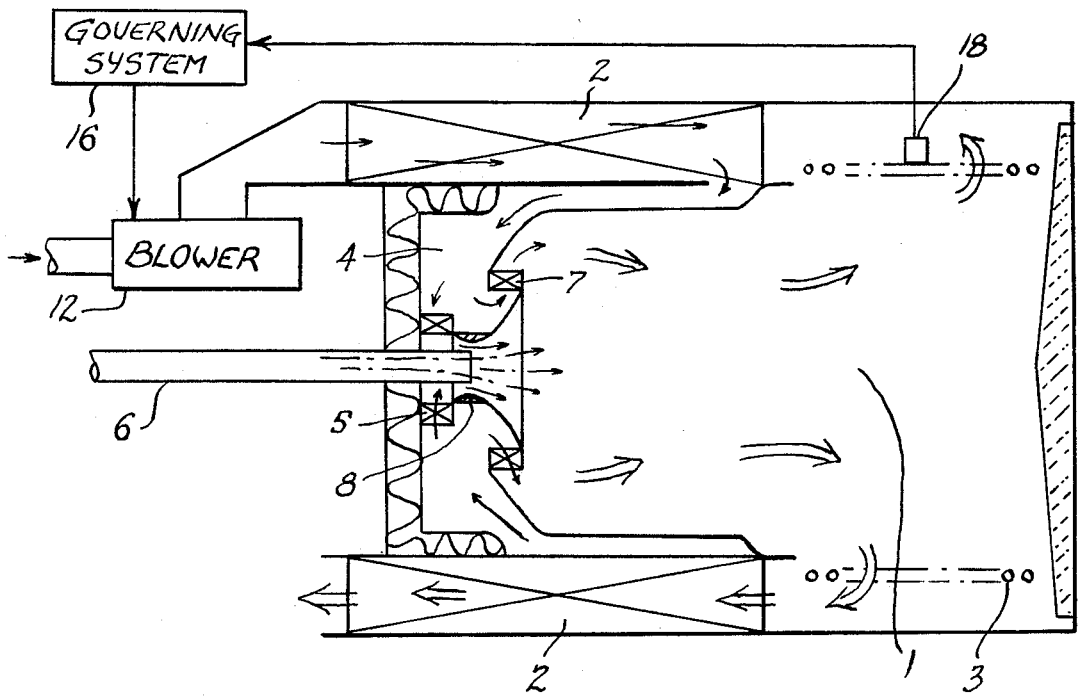

United States Patent [19]

Alpqvist

[11] Patent Number: 4,676,736
[45] Date of Patent: Jun. 30, 1987

[54] COMBUSTION DEVICE FOR COMBUSTION OF A GASEOUS FUEL

[75] Inventor: Jan Å. Alpqvist, Linköping, Sweden

[73] Assignee: Gas Research Institute, Chicago, Ill.

[21] Appl. No.: 789,295

[22] Filed: Oct. 18, 1985

Related U.S. Application Data

[63] Continuation of Ser. No. 696,882, Jan. 31, 1985, abandoned, which is a continuation of Ser. No. 415,039, Sep. 7, 1982, abandoned.

[51] Int. Cl.$^4$ ............................................. F23D 11/44
[52] U.S. Cl. .................................... 431/243; 239/405; 431/242; 431/351; 431/187; 431/158; 60/758
[58] Field of Search ............... 431/351, 242, 243, 158, 431/183, 187, 354; 60/758, 757; 239/403, 405, 406

[56] References Cited

U.S. PATENT DOCUMENTS

| | | | |
|---|---|---|---|
| 1,395,139 | 10/1921 | Porter | 431/354 |
| 2,872,971 | 2/1959 | Clark et al. | 431/351 |
| 3,570,242 | 3/1971 | Leonardi et al. | 431/354 |
| 4,067,191 | 1/1978 | Gronvall et al. | 60/39.27 |
| 4,281,983 | 8/1981 | Goodnight et al. | 431/187 |
| 4,351,632 | 9/1982 | Nagai | 431/351 |
| 4,365,951 | 12/1982 | Alpkvist | 431/243 |
| 4,389,185 | 6/1983 | Alpkvist | 431/243 |
| 4,526,529 | 7/1985 | Bernard et al. | 431/351 |
| 4,547,147 | 10/1985 | Suzuki | 431/317 |
| 4,556,384 | 12/1985 | Laurenceau et al. | 431/183 |

Primary Examiner—Samuel Scott
Assistant Examiner—H. A. Odar
Attorney, Agent, or Firm—Rhodes and Boller

[57] ABSTRACT

A combustion device for combustion of a gaseous fuel with air is provided with means for supplying gas automatically at a mass flow rate corresponding to a mass flow of air governed by the demand of heat. The gas is supplied at a pressure slightly above atmospheric pressure to an ejector using preheated primary air as a carrying medium. The ejector is mounted in a flow path in series with and after a blower, a recuperative preheater and a swirl device but prior to a system of heater tubes and the exhaust passages of the preheater.

13 Claims, 2 Drawing Figures

U.S. Patent   Jun. 30, 1987   4,676,736

COMBUSTION DEVICE FOR COMBUSTION OF A GASEOUS FUEL

This application is a continuation of Ser. No. 696,882 filed Jan. 31, 1985, now abandoned, which is a continuation of Ser. No. 415,039 filed Sept. 7, 1982, now abandoned.

This invention relates to a combustion device for combustion of a gaseous fuel with air and of the type comprising a preheater for heating the combustion air by exhaust gases leaving the device, a blower for supplying air to the preheater, a device for governing the mass flow of air supplied and a plenum chamber for preheated air from which a first and a second swirl device guide the air as primary and secondary air for the combustion.

It is known e.g. from the U.S. Pat. No. 4,067,191 to control the combustion of a fuel with air by governing the mass flow of air, measuring the mass flow of air and subsequently governing the mass flow of fuel in dependence on the measured mass flow of air. The U.S. patent application Ser. No. 202,473 filed Oct. 31, 1980 shows the use of preheated air for primary as well as for secondary air in connection with combustion of a volatized fuel.

It is possible to use the known devices without modifications also for the combustion of fuels which are gaseous without being volatized. However, the gaseous fuels must be supplied at pressures higher than the pressure drop across the combustion device including the preheater and very often gas is delivered through a network of tubes at a pressure only slightly above atmospheric pressure.

It is certainly possible to raise the gas pressure by a pump, but this complicates the system and necessarily results in increased equipment and operating costs.

The object of the present invention is to provide a combustion device of the type referred to above which is extremely cheap and reliable. This is accomplished by providing a first swirl device upstream of an ejector and positioning a tube delivering gas at a pressure slightly above atmospheric pressure so that it protrudes into and terminates at the ejector. The ejector includes a restriction providing its smallest area of flow so that air pressure in this area is lower than the gas pressure in the gas supply tube which terminates at the restriction. One skilled in the art immediately would realize that by reducing the static air pressure in this area to atmospheric or slightly below, a gas pressure slightly above atmospheric is sufficient to supply an associated combustion chamber. A plenum chamber adjacent the first swirl device and ejector receives preheated air from the preheater. The discharge of a blower supplying air to a preheater is regulated to maintain air supplied to the plenum chamber at a predetermined temperature; accordingly, the mass of air supplied by the blower varies, retaining this temperature. Turbulent preheated air is also supplied to the combustion chamber from the plenum by a second swirling device.

Figure 2:
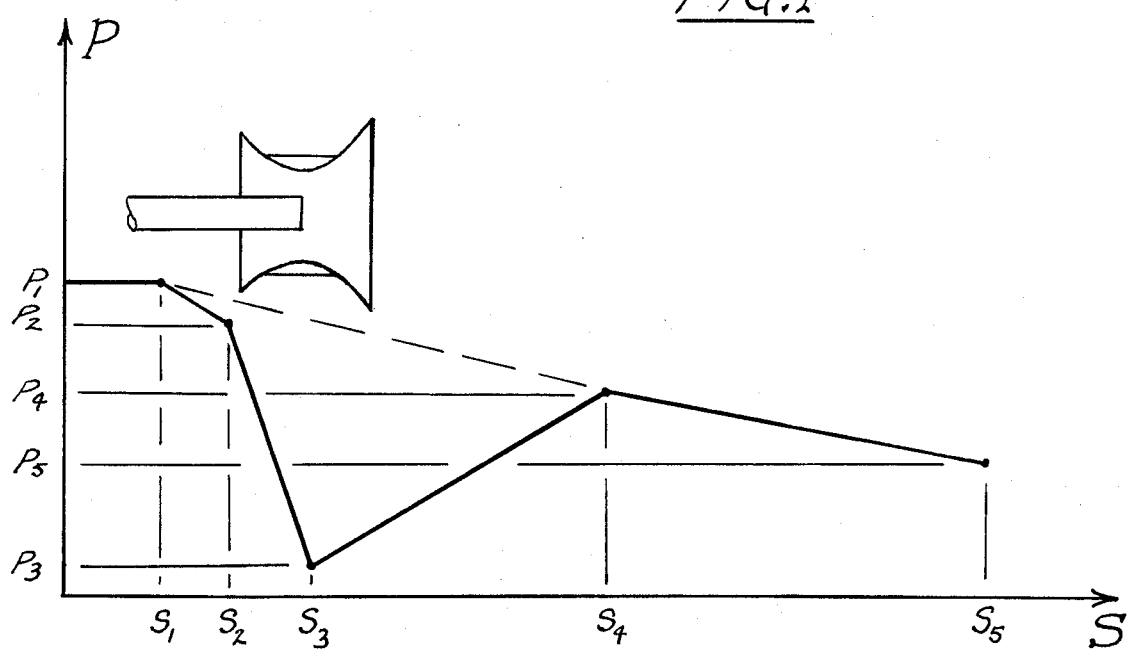

The invention will be explained in more detail reference being made to the drawing in which FIG. 1 schematically and in axial section shows a combustion device according to the invention used for heating a hot gas engine and, FIG. 2 is a diagram showing the air pressure as a function of the flow path.

FIG. 1 shows a combustion chamber 1 surrounded by a preheater 2 and arranged adjacent a number of heater tubes 3 containing a gaseous working medium of a hot gas engine, not otherwise shown. Combustion gases, shown as double arrows, are formed in the combustion chamber 1 and are partly cooled off as they pass around the tubes 3. They leave the device through the preheater 2, which is of the recuperative type having neighbouring passages for combustion gases and for air to be heated. The lower part of the preheater 2, shown in FIG. 1, shows a passage for combustion gases whereas the upper part of the preheater illustrates a passage for an incoming air flow, shown by single arrows. The air is delivered by a blower 12 at a mass flow rate governed by governing system 16, depicted schematically, depending upon the temperature of the working medium in the tubes 3. FIG. 1 shows governing system 16 including temperature probe 18, also depicted schematically. A suitable governing system is shown more specifically, e.g. in U.S. Pat. No. 4,067,191.

After having passed the preheater 2, the air enters into a plenum chamber 4 from which it may escape as primarily air through a swirl device 5 surrounding a gas supply tube 6 or as secondary air through a swirl device 7 adjacent combustion chamber 1. The air passing through swirl device 5 acts as primary air and is passed through a restriction 8 of an ejector device into which gas supply tube 6 protrudes. The rich mixture of gas and primary air is ignited as soon as it is mixed sufficiently with secondary air due to the prevailing high temperature in the combustion chamber or due to a spark plug not shown.

The device described and shown in FIG. 1 will operate as follows, reference now also being made to FIG. 2.

The pressure of the air delivered by blower 12 to the plenum chamber 4 is $p_1$, the plenum chamber 4 having the position $s_1$ in FIG. 2. After the swirl device 5 but prior to reaching the restriction 8, the secondary air pressure is $p_2$ this position being shown at $s_2$ in FIG. 2. The pressure at restriction 8 is $p_3$ which is pressure lower than the pressure of the gas supplied through the tube 6. The pressure in the plenum chamber 1 is $p_4$ and the position is $s_4$ in FIG. 2, while the pressure $p_5$ is the pressure of the exhaust gases after they have passed the preheater. This pressure is slightly above atmospheric pressure.

The pressure drop $p_1-p_4$ is the pressure drop across swirl device 7 to which the secondary air is exposed as indicated by a dotted line.

The gas flow through the tube 6 is indicated by dash-dotted lines and the mass flow of gas is a function of the mass flow of air supplied.

I claim:

1. A combustion device for a hot gas engine having a plurality of tubes containing working gas, the combustion device for combustion of a gaseous fuel with air, the gaseous fuel being supplied at a pressure slightly above atmospheric, the device comprising a combustion chamber; a preheater for heating the combustion air by exhaust gases leaving the combustion chamber; a blower for supplying air to the preheater; means for governing the mass flow of air supplied from said blower; a plenum chamber receiving preheated air from said preheater and delivering said preheated air to said combustion chamber, said plenum chamber including first and second swirl devices for guiding the preheated air as primary and secondary air respectively for combustion; means for delivering a mass flow of gaseous fuel to said combustion chamber as a function of the mass flow of preheated air supplied, said fuel delivery means including an ejector having a flow restriction and a tube supplying said gaseous fuel at a pressure slightly above atmospheric to said flow restriction, said tube having an open terminal end protruding into and terminating within said ejector at a most restricted flow area in said restriction, and said first swirl device being located upstream of said ejector.

2. The combustion device as described in claim 1 wherein said primary air flows through said restriction adjacent said gas tube terminal end creating a static pressure at said tube terminal end lower than the pressure of gas supplied by said tube.

3. The combustion device as described in claim 1 wherein the preheater is of a recuperative type.

4. The combustion device as described in claim 1 wherein said means for governing the mass flow of air supplied from said blower includes means for regulating output of said blower in accordance with temperature of the working gas.

5. The combustion device as described in claim 1 wherein said tube's open terminal end comprises an opening, the plane of which is essentially perpendicular to the length of said tube.

6. A combustion device for a hot gas engine having a plurality of tubes containing working gas, the combustion device for combustion of a gaseous fuel with air, the gaseous fuel being supplied at a pressure slightly above atmospheric, the device comprising a combustion chamber; a preheater for heating the combustion air by exhaust gases leaving the combustion chamber; a blower for supplying air to the preheater; means for governing the mass flow of air supplied from said blower; a plenum chamber receiving preheated air from said preheater and delivering said preheated air to said combustion chamber, said plenum chamber including first and second swirl devices for guiding the preheated air as primary and secondary air respectively for combustion; means for delivering a mass flow of gaseous fuel to said combustion chamber as a function of the mass flow of preheated air supplied, said fuel delivery means including an ejector, a flow restriction in said ejector, a tube supplying said gaseous fuel at a pressure slightly above atmospheric to said flow restriction, said tube having an open terminal end protruding into and terminating within said ejector at a most restricted flow area in said restriction, and said first swirl device being located upstream of said ejector, and wherein said primary air flows through said restriction adjacent said gas tube terminal end creating a static pressure at said tube terminal end lower than the pressure of gas supplied by said tube.

7. In a hot gas engine of the type wherein a hot working gas receives thermal energy via heat exchange structure from a combustion device in which gaseous fuel is combusted with air to generate the thermal energy, and having preheater means for preheating the air by thermal energy extracted from the products of combustion of the gaseous fuel and air by said combustion device, means for pressuring the air to create flow through an inflow path through said preheater means, through mixing and combustion zones of said combustion device, and then through an outflow path through said preheater means, the improvement which comprises means to split the air flow downstream of the inflow path through said preheater means into a primary path through the mixing zone of said combustion device and then into the combustion zone and into a secondary path which by-passes the mixing zone and leads directly to the combustion zone, a conduit for connection to a gaseous fuel supply which supplies the gaseous fuel, said conduit having an outlet disposed to introduce gaseous fuel from said supply into the primary path and the mixing zone before the primary path reaches the combustion zone, and means at the conduit's outlet acting on the primary path to create a pressure lower than that of the gaseous fuel at the conduit's outlet so that the gaseous fuel is drawn by air flow through the primary path for mixture with the air to form a rich mixture which passes to the combustion zone to combust therein with the air entering the combustion zone via the secondary path.

8. The improvement set forth in claim 7 in which said conduit's outlet comprises an opening which is disposed in a plane which is transverse to the direction of the flow of gaseous fuel through said conduit and in which said means at the conduit's outlet acting on the primary path comprises an annular restrictor disposed around the conduit's outlet.

9. The improvement set forth in claim 7 in which the combustion device includes means by which the outflow path through said preheater means is exposed to generally atmospheric pressure and means by which the pressure of the gaseous fuel from said supply in said conduit is supplied slightly above atmospheric pressure.

10. The improvement set forth in claim 7 including plenum means disposed downstream of the inflow path through said preheater means, a first swirl device disposed between said plenum means and said primary path upstream of the location of said conduit's outlet and a second swirl device disposed in the secondary path between said plenum means and the combustion zone upstream of where the air flow through the secondary path combusts with the rich mixture from the mixing zone.

11. The improvement set forth in claim 10 in which said means acting on the primary path at the conduit's outlet comprises an annular restrictor disposed around the conduit's outlet and including an outwardly flared annular wall surface extending from said restrictor in the direction of flow.

12. The improvement set forth in claim 11 in which said second swirl device is disposed around the outlet of said outwardly flared annular wall surface.

13. The improvement set forth in claim 12 in which said first swirl device is disposed around the inlet of said restrictor, said first swirl device having a diameter less than the diameter of said second swirl device.

* * * * *